United States Statutory Invention Registration [19]

[11] Reg. Number: H165

Silsby [43] Published: Nov. 4, 1986

[54] MEANS TO CONTROL SABOT PETAL TRAJECTORY AT START OF DISCARD

[75] Inventor: Graham F. Silsby, Harford County, Md.

[73] Assignee: The United States of America as represented by the Secretary of the Army, Washington, D.C.

[21] Appl. No.: 841,387

[22] Filed: Feb. 24, 1986

[51] Int. Cl.[4] ..... F42B 13/16

[52] U.S. Cl. ..... 102/520

*Primary Examiner*—Harold J. Tudor

*Attorney, Agent, or Firm*—Anthony T. Lane; Harold H. Card, Jr.; Michael C. Sachs

[57] ABSTRACT

The invention provides for precise control of the initial trajectory of the petals of a discarding sabot from a gun-launched, sabot-driven projectile, so as to eliminate or minimize unbalanced forces on the projectile and avoid disturbance of its flight path. To achieve this precision, a separate, symmetrically oriented hinging element between the sabot petals is used. The hinging element is structurally separate from any means by which the sabot is secured to the projectile or other ammunition components, so that its shape and location, and the material from which it is made, may be oriented specifically to this function. The sabot petals are furthermore contoured with relief cuts so that as the petals rotate open about the projectile, the stress on the hinging element becomes sufficient to rupture it only after the petals have opened sufficiently to clear the projectile.

10 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MEANS TO CONTROL SABOT PETAL TRAJECTORY AT START OF DISCARD

The invention described herein may be manufactured, used and licensed by or for the Government for Governmental purposes without payment to me of any royalties thereon.

FIELD OF THE INVENTION

This invention relates to discarding sabots as used in artillery or other projectile tube-launch systems. Sabots have been used on service weapons and experimental launchers for years, for the purpose of harnessing the force of the propellant gases and guiding the projectile out of the gun muzzle. However, the art of sabot discard trajectory control is relatively undeveloped.

BACKGROUND OF THE INVENTION

The usual intent in this art is to ensure disengagement or release of the projectile's driving groove faces without exerting unbalanced forces on the projectile, to avoid disturbing its flight. Symmetric construction and application of aeroballistic, muzzle blast, and/or inertial forces have been the primary means of controlling the discard. A form of bore-riding metal band at the forward end of the sabot, with weakening notches at the sabot petal interfaces, is applied in service armor-piercing, discarding sabot long rod penetrator ammunition. At shot ejection, the muzzle blast acts on a rear scoop on the saddle-type sabot petals. Each petal hinges open around a line through each pair of weakened portions of the band, lifting cleanly away from the driving lands. After a short opening rotation of the petals, from the rear, the material in the weakened portion breaks, releasing the separate petals to act individually. The aerodynamic forces on the front scoop then cause the forward end of the petals to rotate away from the long rod projectile, or penetrator, effecting full separation.

In another long rod penetrator sabot design, a small metal ring called a tipping ring is attached to the rear of the ramp sabot to keep the ends down against the stripping action of the muzzle blast, until aerodynamic forces on the forward scoops rotate the front of the sabot petals well away from the projectile body.

There are a number of issues associated with each of these approaches. In the latter round, the tipping ring fails to remove the sabot from contact with projectile promptly as the sabot begins to rotate open. With the discard trajectory of the sabot petals otherwise unconstrained, the forces opening the sabot and the long lever arm over which they operate can result in the tearing out of a number of the small driving lands on the rear portion of the sabot. Exertion of these unsymmetric forces on the projectile can cause significant round-to-round dispersion. The metal band on the former round is quite effective, but by its placement it limits the trajectories available. Furthermore, because it combines the functions of hinge and bore rider, the selection of materials from which it can be made is limited. Though a relatively small part of the total in-bore mass, it is nonetheless a parasitic mass. Location at the outer end of the sabot maximizes that mass for a given cross-section, as does the requirement that it be made of metal rather than polymeric plastic material or other light weight materials. Furthermore, the placement of the band at the periphery of the sabot results in the center of pressure of the muzzle blast lying inside the line of action of the hinge sections unless the saboted round is close to half bore diameter. This is not the case with present long rod penetrator ammunition. When the center of pressure of the muzzle blast is inside the axis of the hinges, the petals' form drag tends to keep them closed. The much lower force of lift coupled with blast infiltration must be utilized to effect their opening.

SUMMARY OF THE INVENTION

Accordingly, a purpose of this invention is to control the trajectory of the petals of the discarding sabot from a gun-launched, sabot-driven projectile during the initial phase of sabot discard. The invention disclosed herein makes it possible to release the projectile essentially without the exertion of any force on it, through the elimination of potential sabot-penetrator contact immediately as the sabot petals begin to open. However, it is possible to apply this invention to produce controlled interference with the driving faces of the driving lands if required.

The present invention provides means for attaching each sabot petal to its adjacent sabot petals. The means are usually but not necessarily symmetrically disposed about the projectile, and are structurally separate from any means by which the sabot petals may be secured to the projectile or other ammunition component. The means are further configured and made of appropriate material so that the sabot petals may rotate open and clear of the projectile, with the attaching means functioning as a sort of hinge, while the sabot petals remain attached to each other by said means, until at some pre-determined point the means break or otherwise rupture or disconnect so as to allow the sabot petals to continue to increase their distance from the projectile.

The present invention further provides for sabot petals which are contoured so as to allow them to rotate open about the hinging means while remaining attached to each other by the above means.

In a preferred embodiment, the means for attaching each sabot petal to its adjacent sabot petals are located internally along the length of the sabot petals rather than at their ends.

In the most preferred embodiment, the means for attaching the sabot petals to each other is a ring symmetrically disposed about the projectile axis. In this embodiment, the sabot petals are further contoured with a groove to receive this ring. The ring is most preferably of rectangular cross-section, and made of a light weight material such as a nylon or bakelite. Polypropylux 944 (a trademark of Westlake Plastics of Lenni, Pa.), a void-free, stress relieved formulation of polypropylene copolymerized with a small amount of rubber, may also be used. Light weight metal such as aluminum may also be used.

As described above, the invention herein provides precise constraint of the sabot petals along a planned trajectory as they initially open. The placement and form of the individual elements of the design can be varied to provide a wide range of petal trajectories to suit a variety of design goals, particularly, the clean release of the projectile's driving grooves. The placement of the hinging element can be such that muzzle blast can be exploited to effect rapid disposal of the sabot. Placement and material can be such that the parasitic weight of the hinging element is at a minimum. The type and placement of the hinging means between the petals, in conjunction with suitable contouring or relief of the sabot petals, can be tailored to achieve transfer of the hinging point away from the hinge ring in a prescribed fashion so as to achieve such design goals as bursting the hinge ring promptly and precisely, or changing the opening rate at an appropriate point in the cycle.

DETAILED DESCRIPTION OF THE PREFERRED EMBODIMENT

Figure 1:
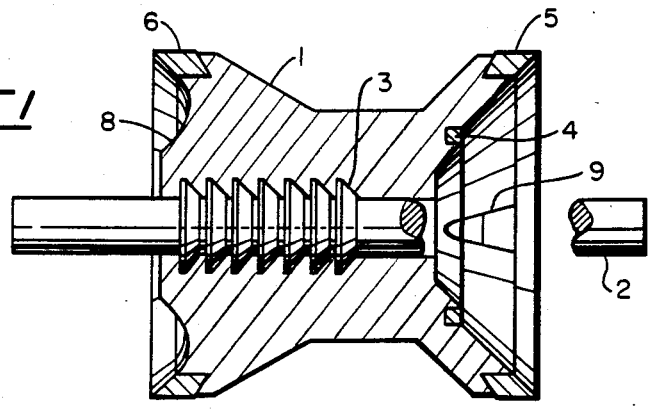
FIG. 1 is a side elevational view of a four petal saddle sabot and penetrator assembly shown with the two petals nearest the observer removed, the bands and ring sectioned, and a portion of the penetrator shown cut away to reveal the relief detail.

FIG. 1 shows a discarding sabot 1 and penetrator 2 assembly intended to fly from left to right as drawn. The interfacing surfaces of the sabot and penetrator are configured with mating sabot teeth and penetrator driving lands 3. Typical driving land geometry is preferred, although single-lead 60° V-form threads may also be used. A hinging element 4 attaches the sabot petals to each other and is shown in this embodiment as a ring of square cross-section. This is the most preferred embodiment, particularly when the ring is made of a lightweight material such as aluminum, nylon, bakelite and the like. However, the hinging element, i.e. the means for attaching each sabot petal to its adjacent petals, may also simply be a tab or flange attaching each petal to its adjacent petals, so long as these tabs or flanges are appropriately disposed about the projectile. Such a tab or flange may even be an integral part of the structure of the sabot petals. In the embodiment of FIG. 1, the hinging ring is press fit into a groove machined into the sabot petals. A forward band 5 is wrapped around the outer edge of the sabot to ride the bore wall while the shot is in the gun. This band is released and is swept away when the petals begin to rotate open. A rear band 6 is also wrapped around the rear end of the sabot. This band 6 is slit longitudinally in such a manner that it breaks or is swept away as soon as the sabot clears the gun muzzle. The rear of the sabot petals is contoured as shown at 8 so that the blast from the gun provides the force which initially opens the sabot petals.

The area 9 inside the forward band 5 in FIG. 1 is the contoured or relieved portion of the sabot petals, a critical element of the invention. This portion of the petals is contoured in a manner coordinated with the type of hinging element used, so that the hinging element or elements remain intact while the sabot petals are rotating open, to the point at which the petals are contacting each other only at their ends (i.e., when the relief or contour gap is fully closed). At this point, the teeth of the sabot petals have cleared the driving lands of the penetrator, and the stress on the hinging element has reached the critical point so that it breaks. It may be noted that, on the ammunition cited earlier, the hinging element and the forward band 5 are the same entity. Such an arrangement does not allow the versatility required to achieve the precision of the present invention. Both the location of this band in the other cited ammunition, and the material of which it is made, are quite restricted. The invention herein can be especially well understood in light of this comparison. That is, the combination of contouring of the sabot petals, location of the hinging element, and material from which the hinging element is made are critical features allowing for precise release of the petals.

Returning to FIG. 1, obturation or sealing of the launch package and gun bore against gas leakage is achieved by a combination of means. An elastomeric material coats the entire rear surface 8, sealing the slight gaps left by a good fit of the individual sabot petals and rod. The rear band discussed above forms the primary mechanical seal to the gun bore. The sabot body is made slightly under the basic bore size, while the front and rear bands 5, 6 are slightly oversize. The properties and dimensions of these plastic bands are selected to supply the slight compliance necessary due to imperfections in the gun bore.

Figure 3:
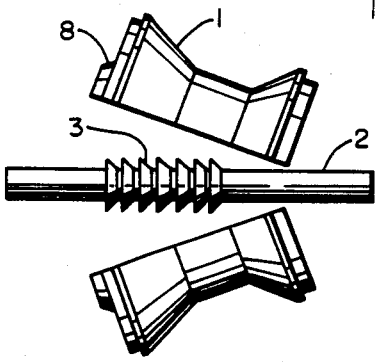
FIG. 3 is a side elevational view of the sabot of FIG. 1 in the final stage of sabot discard.

In FIG. 3 the shot is travelling from left to right. The forward band (already released in the figure) holds the sabot petals in place until the sabot has cleared the gun muzzle. When the rear band clears the muzzle it is swept away by the high pressure gases, freeing the petals to begin rotating open, as shown, under the force of the muzzle blast. The forward band is now released. While the sabot petals are rotating open, the hinge ring or other hinging element is forced to rotate about its toroidal axis at the hinge points. As in bending, the fiber strain is maximized at the inner and outer radii. When the petals have fully opened to the point that only their forward edges remain in contact with each other (the critical point), the strain on the hinging element reaches its critical point, where a controlled bursting occurs. This permits the sabot petals to clear completely from each other without exerting significant unbalanced force on the projectile.

Figure 2:
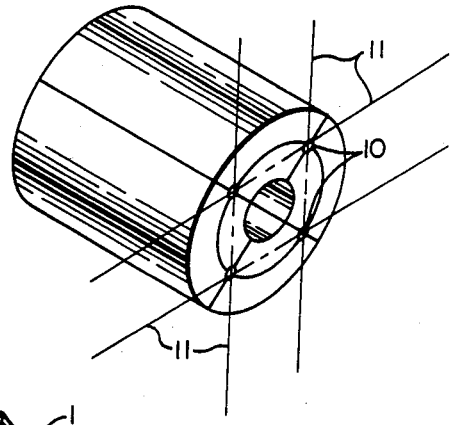
FIG. 2 is a perspective view of a conceptual four petal sabot shown to illustrate the hinge point geometry.

FIG. 2 depicts the geometry of the hinging points 10 and axes of rotation 11, which are shown for clarity as being located at the front end of the sabot. To achieve the proper function, the hinging element or elements, and hence the axes of rotation, need to be located sufficiently ahead of the forward-most driving land on the penetrator and close enough to the penetrator axis for the forward-most sabot tooth crest to clear the mating projectile driving land before the hinging element breaks. The sabot teeth and projectile driving lands 3 are shown in FIGS. 1 and 3. The typical driving land geometry is more favorable than 60° V-form threads when used with this invention. The shallower angle of the buttress-form driving land forward flank permits the location of the driving lands closer to the hinge plane, and hence shortens the overall length of the sabot required, reducing parasitic mass. The interface between sabot teeth and penetrator driving lands covers a considerable portion of the interface between the sabot and the penetrator, and this entire zone of contact must be examined in order to determine the correct location of the hinge axis so as to insure that the driving lands are released cleanly.

In the above discussion, a sabot is described which opens from the rear as a result of gun muzzle blast forces. It should be noted that the invention is not limited to sabots that rotate open from the rear upon leaving the gun muzzle. A sabot which is essentially reversed in design, except for altering the contour of the sabot petals so that they open from the front due to wind force on the projectile, is also desirable. Whereas on the system previously described, the means for attaching each sabot petal to its adjacent sabot petals (i.e., the hinging element or elements) are located along the forward half of the length of the sabot petals, they would be located along the rear half of the length of the sabot petals on this sort of system. It may also be noted that the hinging element on either system can be located at various radial distances from the penetrator axis, anywhere between the inner surface and the outer surface of the sabot, with the contouring or relief cuts of the sabot petals being adjusted accordingly. This is also a distinguishing feature over the prior art ammunition, and may be critical to making maximal use of the gun blast or wind forces in discarding the sabot promptly and precisely.

It is not necessary that the hinging element or elements actually break when the sabot petals are released. On systems where the sabot petals open from the front, the hinging element may simply be designed to expand under stress at the critical point, leaving the petals attached but free of the penetrator, so that air drag causes the petal assemblage to drop away to the rear of the projectile. In such a system applied to launch experimental penetrators, a plastic sabot is used for push-launching a long projectile, and is also designed to trap a massive tool steel pusher plate in the opened sabot so that the high aerodynamic drag forces will decelerate the entire assemblage. A sabot of tough plastic is machined as a single piece to accept the smooth rod or penetrator and the pusher plate. The sabot is slit, typically into four petals, from the forward scoop to a point just aft of the forward edge of the pusher plate. A relief cut is made in the rear to just forward of the rear face of the pusher plate. The thickness of the hinge element is adjusted to provide the appropriate flexibility and strength. In this case the hinge element is an integral part of the sabot. The seat for the pusher plate is contoured in such a fashion as to retain the pusher plate for ease of loading but permit the sabot petals to open as desired. On firing, the forward scoop catches the air, forcing the petals to open to the critical point and closing the relief contour gap. At this point, further motion is halted by the hinging elements which act as tensile ligaments holding the petals together. The sabot and pusher plate then drop away to the rear of the projectile.

The effectiveness of any means of sabot petal discard trajectory control is measured in its effect on the flight body itself. The slight unbalanced forces occurring at shot ejection result in deflection of the trajectory from the intended shot line, causing random shot-to-shot dispersion. The dispersion of a gun used as a system to accurately deliver a payload at a considerable distance is ultimately one of the primary measures of the system's effectiveness. On the other hand, in terminal ballistics experiments, the target is usually mounted very close to the gun, and hence the set-up is considerably more tolerant of high dispersion. Thus, what may be an unacceptable performance in a weapon may be acceptable in a laboratory sabot. However, large unbalanced forces can induce unwanted projectile yaw which cannot be damped out in the short flight. High striking yaw seriously degrades the penetrator's performance and renders the results of the experiment useless. In the main, the effectiveness of a particular saboting scheme is measured in terms of striking yaw in terminal ballistic experiments. The invention described herein is an improvement in sabot art increasing the effectiveness of both military weapons and laboratory guns.

The invention disclosed herein permits the use of materials for the hinging element with a broad range of values for strength and elongation to rupture. The force required to resist the initial tendency of the sabot to open from the wrong end at shot ejection is obtained by selecting the hinge ring cross-sectional area normal to the toroidal axis so as to not exceed the hinge ring material's tensile yield stress. It is difficult to control strength and ductility independently, but the hinge ring can be made to rupture at the desired rotation more or less independently of ring material strength by tailoring the ring geometry, particularly at the hinge point. The usual goal would be to have the ring fail under only small amounts of tension following rotation to the critical point. A rectangular ring geometry is advantageous. The thickness of the ring in the radial direction is selected such that just prior to the critical point, the appropriate strain has been induced in the hinge area to accumulate microscopic damage just short of that necessary to cause failure. Superposition of uniaxial tension when the critical point is reached is sufficient to rupture the ring.

For materials with little elasticity, a small radial thickness may be necessary to minimize the maximum fiber strain for unit petal rotation. For hinge ring materials strong enough that even a small band size might present practical problems, it may be necessary to maintain a given ring thickness but weaken the ring at the hinge. For high elongation materials, the strain induced relative to the strength of the ring material can be maximized by preferentially removing the material in the relatively unstrained region lying along the toroidal axis in the hinge area. This can be effected by means of a hole of appropriate size parallel to the penetrator axis. In addition, the sabot contouring or relief can be made large and the profile curved to provide a tailored change in mechanical advantage during the movement of the petal contact points forward before the ring breaks.

It will be apparent for those skilled in the art that numerous variations may be made in the preferred embodiments of the invention described above without departing from the spirit and scope of the invention. Accordingly, the foregoing description is to be construed in an illustrative and not in a limitative sense.

I claim:

1. An apparatus for controlling the initial trajectory of the petals of a discarding sabot from a gun-launched, sabot-driven projectile, comprising:

(a) means for attaching each sabot petal to its adjacent sabot petals, which means are configured and made of appropriate material so as to act as a hinge which allows the sabot petals to rotate open out of contact with the projectile, to the point of contacting each other only at their ends, while said sabot petals remain attached to each other by said means, and so that at that point said means rupture so as to allow the sabot petals to release from the projectile, and (b) sabot petals which are contoured or relieved at the ends so as to allow them to rotate open about an axis through adjacent hinge points to the point of the relief contour's flanks contacting each other only at their ends, while the sabot petals remain attached to each other by said means.

2. An apparatus as in claim 1, wherein the means for attaching each sabot petal to its adjacent sabot petals are spaced from the ends of the sabot petals.

3. An apparatus as in claim 2, wherein the means for attaching each sabot petal to its adjacent sabot petals is a ring symmetrically disposed about the projectile axis, and wherein the sabot petals are further contoured with a groove to receive said ring.

4. An apparatus as in claim 3, wherein said ring is of rectangular cross-section.

5. An apparatus as in claim 4, wherein said ring is made of a nylon or polypropylene-rubber copolymer.

6. An apparatus as in claim 2, wherein the sabot petals and projectile are contoured with mating teeth and driving lands and wherein the means for attaching each sabot petal to its adjacent sabot petals, and the contour of the sabot petals, are such that the teeth on the sabot petals may rotate open and free of all driving lands on the projectile while the sabot petals remain attached to each other by said means.

7. An apparatus as in claim 2, wherein the means for attaching each sabot petal to its adjacent sabot petals are located along the forward half of the length of the sabot petals, and the sabot petals are contoured so as to open from the rear end of the projectile upon launch.

8. An apparatus as in claim 2, wherein the means for attaching each sabot petal to it adjacent sabot petals are located along the rear half of the length of the sabot petals, and the sabot petals are contoured so as to open from the forward end upon launch.

9. An apparatus as in claim 2, wherein the means for attaching each sabot petal to its adjacent sabot petals is a metal tab or flange.

10. An apparatus as in claim 9, wherein the metal tab or flange is an integral part of the structure of the sabot petals.

* * * * *